United States Patent
Brinson et al.

(10) Patent No.: US 8,024,699 B2
(45) Date of Patent: *Sep. 20, 2011

(54) TESTING SUB-SYSTEMS OF A SYSTEM-ON-A-CHIP USING A CONFIGURABLE EXTERNAL SYSTEM-ON-A-CHIP

(75) Inventors: Kenneth O. Brinson, Austin, TX (US); Sanjay Gupta, Austin, TX (US); Binh T. Hoang, Austin, TX (US); James M. Stafford, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/195,716

(22) Filed: Aug. 21, 2008

(65) Prior Publication Data

US 2008/0313583 A1    Dec. 18, 2008

Related U.S. Application Data

(63) Continuation of application No. 11/181,442, filed on Jul. 14, 2005, now Pat. No. 7,434,182.

(51) Int. Cl.
*G06F 9/455* (2006.01)
*G06F 17/50* (2006.01)

(52) U.S. Cl. ........................ 716/138; 716/111

(58) Field of Classification Search .................. 716/4–5, 716/16, 111.138

See application file for complete search history.

(56) References Cited

U.S. PATENT DOCUMENTS

| | | |
|---|---|---|
| 6,427,224 B1 | 7/2002 | Devins et al. |
| 6,434,735 B1 | 8/2002 | Watkins |
| 6,487,699 B1 | 11/2002 | Devins et al. |
| 6,539,522 B1 | 3/2003 | Devins et al. |
| 6,571,373 B1 | 5/2003 | Devins et al. |
| 6,598,468 B2 | 7/2003 | Zur Loye et al. |
| 6,615,167 B1 | 9/2003 | Devins et al. |
| 6,735,756 B1 | 5/2004 | Linn et al. |
| 6,757,882 B2 | 6/2004 | Chen et al. |
| 6,865,502 B2 | 3/2005 | Devins et al. |
| 6,868,545 B1 | 3/2005 | Devins et al. |
| 2003/0145290 A1 | 7/2003 | Devins et al. |
| 2005/0193254 A1 | 9/2005 | Yee |
| 2006/0031807 A1 | 2/2006 | Abramovici |

*Primary Examiner* — Suresh Memula
(74) *Attorney, Agent, or Firm* — Stephen J. Walder, Jr.; Matthew B. Talpis (57) ABSTRACT

Mechanisms are provided in which a previously verified SoC is coupled to a SoC under test via a communication bus or other type of communication interface. The previously verified SoC is provided with the same test stimuli as the SoC under test and thus, generates expected test results data. The test stimuli are sent to the SoC under test via a peripheral communication interface between the previously verified SoC and the SoC under test. The SoC under test generates actual test results data that is output to the previously verified SoC. The previously verified SoC may then compare the expected test results data with the actual test result data generated by the SoC under test to determine if they match. If the two sets of data do not match, then a mismatch notification may be generated and output.

9 Claims, 5 Drawing Sheets

TESTING SUB-SYSTEMS OF A SYSTEM-ON-A-CHIP USING A CONFIGURABLE EXTERNAL SYSTEM-ON-A-CHIP

This application is a continuation of application Ser. No. 11/181,442, filed Jul. 14, 2005, status allowed.

BACKGROUND OF THE INVENTION

1. Technical Field

The present invention relates generally to an improved apparatus and method for testing a system-on-a-chip. More specifically, the present invention is directed to an apparatus and method for testing sub-systems of a system-on-a-chip model using a configurable, previously verified, system-on-a-chip model as an external model in a simulation environment.

2. Description of Related Art

The complexity and sophistication of present-day integrated circuit (IC) chips has advanced significantly over those of early chip designs. Where formerly a chip might embody relatively simple electronic logic blocks effected by interconnections between logic gates, advanced semiconductor manufacturing technique have resulted in the ability to design silicon chips having millions of transistors available that permit different types of functions to be placed on the same chip. Thus, a complete system including micro-processors, memory, analog and power, etc. can be built on a single chip. Currently, chips can include combinations of complex, modularized IC designs often called "cores" which together constitute an entire "system-on-a-chip," or SoC. The key concept in SoC design is that a chip can be constructed rapidly using third-party and internal intellectual property (IP), i.e. pre-designed behavior or physical descriptions of a standard component.

In general, IC chip development includes a design phase and a verification phase for determining whether a design works as expected. The verification phase has moved increasingly toward a software simulation approach to avoid the costs of first implementing designs in hardware to verify them.

Typically, in verifying a design, a simulator is used. Here, "simulator" refers to specialized software whose functions include accepting software written in a hardware description language (HDL), such as Verilog or VHDL, for example, which models a circuit design (for example, a core as describe above), and using the model to simulate the response of the design to stimuli which are applied by a test case to determine whether the design functions as expected. The results are observed and used to debug the design.

In order to achieve acceptably bug-free designs, verification software must be developed for applying a number of test cases sufficient to fully exercise the design in simulation. In the case of SoC designs, the functioning of both the individual cores as they are developed, and of the cores interconnected as a system must be verified. Simulation which includes processor cores tends to require an inordinate amount of time and computing resources largely because the processor core is usually the most complex piece of circuitry on the chip and interacts with many other cores on the SoC.

In addition to this, in order to completely verify the operation of the SoC, it is often necessary to provide external devices to test the peripherals of the SoC, e.g., the communication connections of the SoC for communicating with devices external to the SoC. Thus, it then becomes necessary, in a simulation environment, to generate models of these external devices that may be integrated with the simulation of the SoC itself. These additional models represent additional difficulty, time and monetary cost, with regard to building and debugging these models, to simulate the required devices and to analyze the results of the simulation.

To avoid having to generate models of external devices, some simulations have the peripherals of the SoC wrapped, i.e. the SoC's inputs are tied to its outputs. Alternatively, two similar unverified device models may have their inputs and outputs tied to each other. In both cases, there is no ability to absolutely verify and debug the SoC since both input and output are associated with unverified device models and it is not possible to determine where exactly the error, if any, lies.

Often, models of external devices are available from third party vendors of these external devices which may be integrated with the test application for testing the SoC. However, even with these already established models, much effort is necessary to make the models compatible with the existing simulation environment.

Moreover, even if third party developed models of external devices are used to verify the operation of a SoC, it is still necessary to create and verify checker programs for checking the data generated by these external device models. That is, the third party developed models only provide a mechanism for simulating the initiation of transactions with the SoC and the receiving of results data from the SoC. They do not provide any means for checking the validity of the results data received. Thus, additional checking software must be developed for determining whether the generated results data indicates proper operation of the SoC or not.

All of these factors lead to a problem in that the time required to test the model of the external devices in the simulation environment may exceed the test time for the SoC that is actually being verified. Thus, it can be appreciated from the foregoing that verification of an SoC represents a substantial investment in time and money, due to the necessity of developing and executing software for performing the numerous test cases required to fully exercise the SoC design.

SUMMARY OF THE INVENTION

In view of the above, it would be beneficial to have an apparatus and method for reducing the amount of time and money necessary in verifying a System-on-a-Chip (SoC) design. The present invention provides an apparatus and method for reducing the amount of time and money required for SoC verification by using a previously verified version of the SoC as a basis by which to perform verification.

Typically, as an SoC develops over time, there will be multiple versions of the SoC that are designed and verified. These various versions of the SoC may differ somewhat but their operation with external devices will tend to be similar so as to maintain compatibility with external devices in existence. The present invention uses this compatibility to provide a mechanism in which a previously verified SoC model is coupled to a SoC model under test via a communication bus model or other type of communication interface model. This previously verified model of an earlier version of the SoC, in a preferred embodiment, is a model of a previous version of the SoC under test which has been verified and is programmable such that it may be programmed with the test operating system (TOS) for testing the SoC model under test.

Using a master/slave relationship, the previously verified SoC model is provided with the same test stimuli, e.g., a data transaction, as the SoC model under test. Thus, the previously verified SoC model generates expected test results data against which actual test result data from the SoC model under test may be compared. The test stimuli are sent to the SoC model under test via a model of a peripheral communication link between the previously verified SoC model and the SOC model under test. The SoC model under test generates actual test result data, e.g., transaction result data, that is output, via the peripheral communication link, to the previously verified SoC model. The previously verified SoC model may then compare the expected test results data generated by itself with the actual test result data generated by the SoC model under test to determine if they match. If the two sets of data do not match, then a mismatch notification may be generated and output, such as to a display for viewing by a person performing the test, to a test log file, or the like.

In one exemplary embodiment of the present invention, a method is provided, in a data processing system, for testing a model of a device under test. The method includes coupling a model of a previously verified device to a model of a device under test via a communication interface model and programming the model of the previously verified device to store and execute a test program for applying one or more tests to the model of the device under test. The test program is run in the model of the previously verified device to thereby apply the one or more tests to the model of the device under test via the communication interface model. The operation of the device under test may be verified based on results of running the test program.

The device under test and the previously verified device may both be a system-on-a-chip (SoC), the model of the device under test may be a SoC model under test, and the model of the previously verified device may be a previously verified SoC model. The method may further include applying the one or more tests to the previously verified SoC model to thereby generate expected test results. The SoC model under test may generate actual test results based on the application of the one or more tests by the previously verified SoC model. The method may further include comparing the actual test results to the expected test results, determining if there is a mismatch between the actual test results and the expected test results based on the comparison, and outputting results of the comparison. Outputting the results of the comparison may include displaying a notification and/or storing the results of the comparison in a data structure.

In one exemplary embodiment of the present invention, the previously verified SoC model is an earlier version of a same type of SoC as the SoC model under test. The previously verified SoC model and the SoC model under test may have a master/slave relationship, wherein the previously verified SoC model acts as a master device and the SoC model under test acts as a slave device.

In addition to the above, a computer program product is provided comprising a computer useable medium having a computer readable program that cause a computing device to perform the method described above. Moreover, an apparatus for testing a model of a device under test is provided that includes a processor and memory coupled to the processor. The memory is programmed with instructions, which when executed by the processor, causes the processor to implement the method described above.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides an apparatus and method for testing and verifying the operation of a system-on-a-chip under test using a previously verified system on a chip model. As such, the mechanisms of the present invention are intended to be implemented in one or more data processing systems. With this in mind, the present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
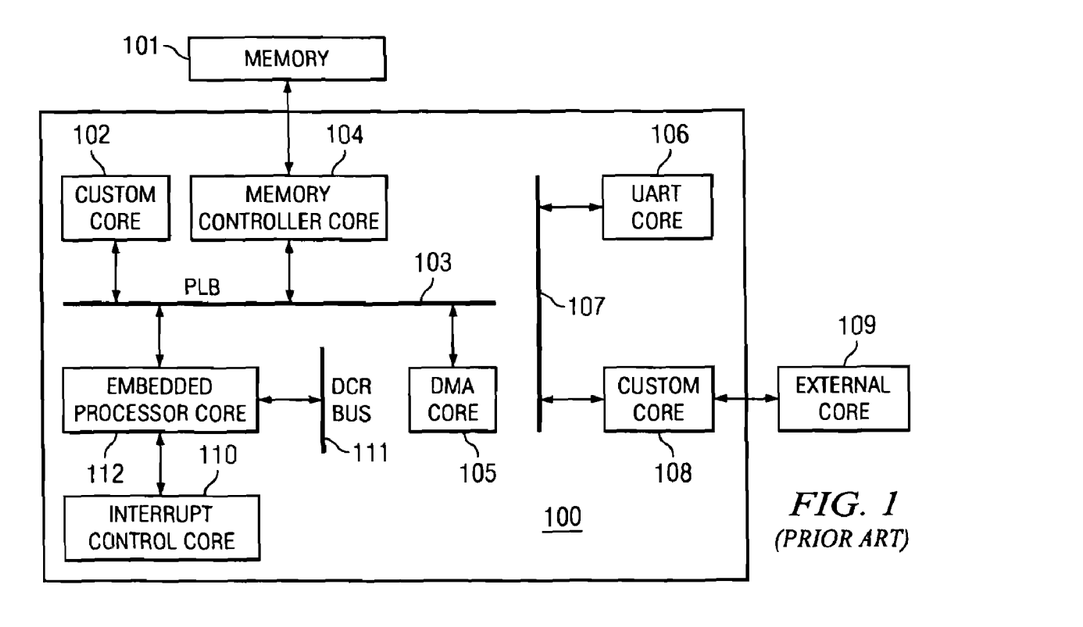
FIG. 1 is an exemplary diagram illustrating exemplary components of a System-on-a-Chip (SoC) design.

With reference now to the figures, FIG. 1 is an exemplary diagram illustrating exemplary components of a System-on-a-Chip (SoC) design 100. The representation providing in FIG. 1 is intended to include embodiments in any known form of logic design, including HDL modules and netlists that may be simulated and physical implementations. The SoC 100 includes a custom core 102 coupled to a processor local bus (PLB) 103, a memory controller 104 coupled to a memory core 101 and to the PLB, a Direct Memory Access (DMA) core 105 coupled to the PLB, a Universal Asynchronous Receiver Transmitter (UART) core 106 coupled to an on-chip peripheral bus (OPB) 107, a second custom core 108 coupled to a core 109 which is external to the chip, an interrupt control core 110 coupled to an embedded processor core 112 and a device control register (DCR) bus 111 coupled to the embedded processor core 112. Memory core 101 is also external to the SoC 100.

The term "core" as used herein refers to a module of logic representing a circuit design of any degree of complexity, which may be used as a component of a SoC. In its developmental stages, a core is typically embodied as a simulatable HDL program written at some level of abstraction, or in a mixture of abstraction levels, which can describe the function of the core prior to its actual physical-implementation in silicon. Major levels of abstraction that are generally recognized include a behavioral level, a structural level, and a logic gate level. A core may be, for example, in the form of a netlist including behavioral, structural and logic gate elements. Ultimately, after verification, design logic represented by a core is physically implemented in hardware.

Custom cores 102 and 108 represent design logic tailored to a particular application of the SoC. Other cores, such as the DMA and UART cores 105 and 106, may have well-standardized embodiments (sometimes called Application-Specific Integrated Circuits or ASICs) which are widely available from vendors. Typically, the design of a SoC comprises a combination of such custom cores and ASICs.

Figure 2A:
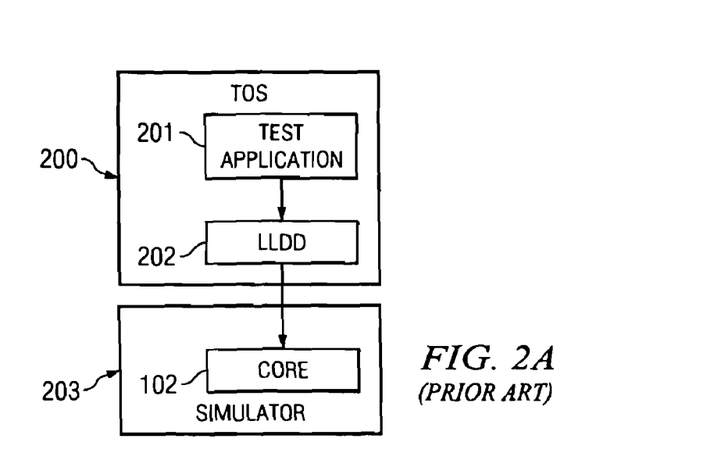
FIGS. 2A-2C are exemplary diagrams illustrating components of test operating system (TOS) software according to a known mechanism.

FIG. 2A is an exemplary diagram illustrating components of test operating system (TOS) software according to a known mechanism. As shown in FIG. 2A, to enable verification of a component core of a SoC design 100, the TOS 200 comprises at least a test application 201 which generates a test case which is applied by a low-level device driver (LLDD) 202 to a core, e.g., custom core 102 implemented as an Hardware Definition Language (HDL) module. Simulator 203 interprets HDL descriptions in the core 102 to simulate the behavior of a hardware device corresponding to the core, in response to the test stimulus.

The test case generated by the test application 201 typically comprises computer-executable instructions which generate stimuli to verify the design. The application of the test case typically produces, as output, results data representing the response of the simulated design which is compared to expected results, to determine whether the design functions as expected. The design may subsequently be revised to improve performance or debug errors.

Figure 2B:
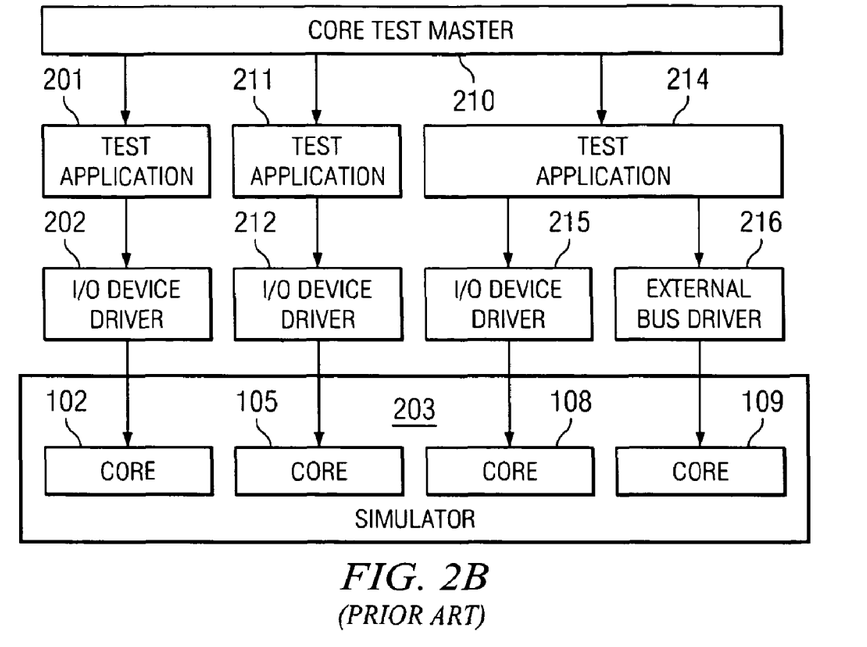
Figure 2C:
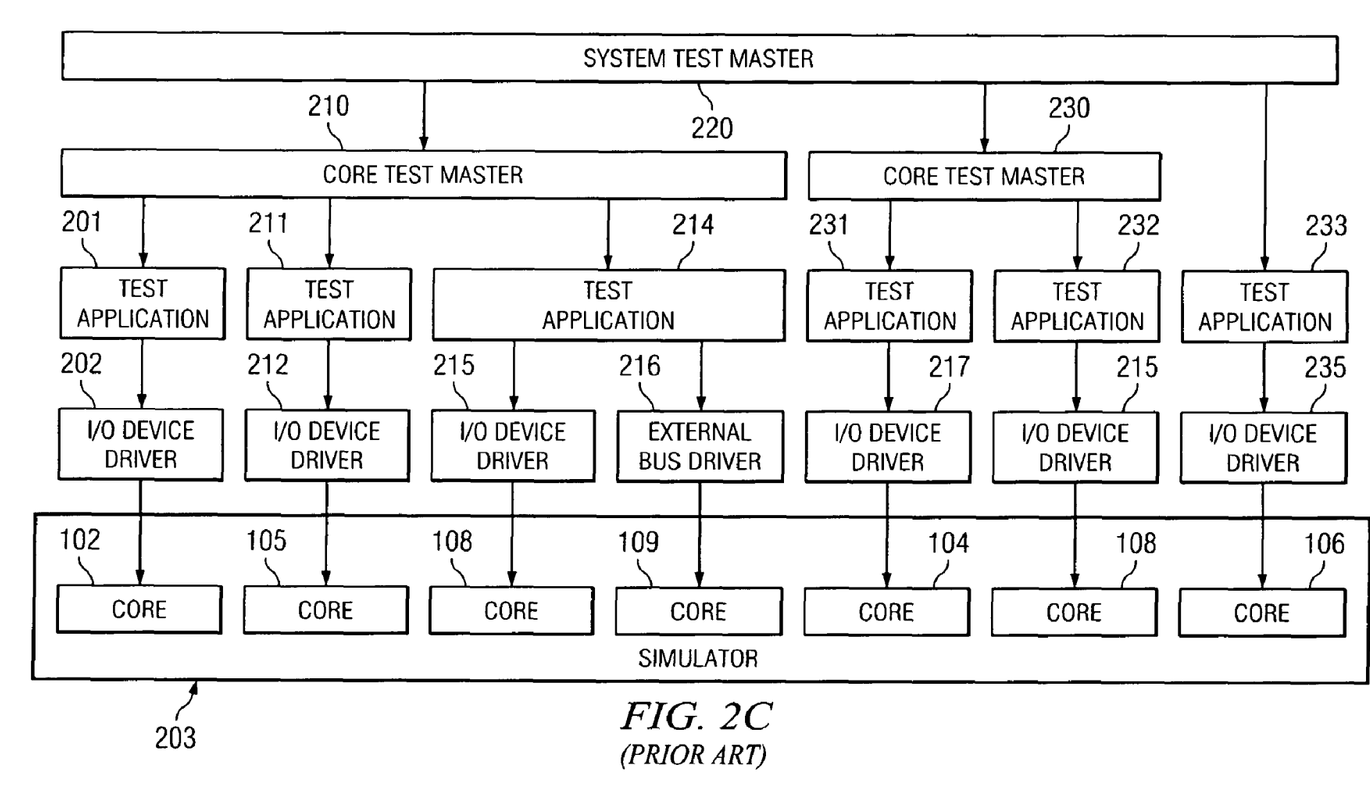

A more general depiction of the TOS 200 is shown in FIGS. 2B and 2C. The TOS 200 is hierarchically organized. An upper level of the TOS 200 may comprise a core test master 210 and a plurality of test applications, such as test applications 201, 211 and 214, or include a still higher level such as a system test master 220 as shown in FIG. 2C. The upper-level code performs such functions as decision-making, test initialization, test randomization, multi-tasking, and comparison of test results with expected results.

FIG. 2B represents test applications 201, 211 and 214 executing under the control of a core test master 210. Each test application corresponds to a particular core 102, 105, 108 and 109 being tested. As shown, the LLDDs may be, more particularly, I/O device drivers such as 202, 212 and 215 which perform operations on cores internal to the SoC 100, and external bus drivers such as 216 which perform operations on cores external to the SoC 100.

FIG. 2C shows a system test master 220 controlling core test masters 210 and 230, which in turn control their respective test applications. The system test master also controls a test application 233 paired with a core 106 via a LLDD 235.

The LLDDs 202, 212, 215, 216, 217 and 235 of FIGS. 2B and 2C represent a low level of the TOS 200. The LLDDs provide an interface between the higher-level software such as the system test masters, core test masters and the test applications, and the core being simulated. Because the cores being simulated correspond to target hardware (i.e., the physical elements which will ultimately implement the design logic), operations on the cores occur on a hardware level. These operations are performed by the LLDDs, and include register I/O and interrupt handling. In an embodiment, the operations on the cores typically comprise Device Control Register (DCR) read and writes (i.e., read and writes to the processor's DCR bus), memory-mapped I/O, and memory reads and writes. A DCR bus 111 (see FIG. 1) is typically used in PowerPC™ architected processors for programming registers in peripheral cores. Memory-mapped I/O refers to a known technique of programming core registers using standard memory read and writes which are decoded to core register addresses.

Figure 3:
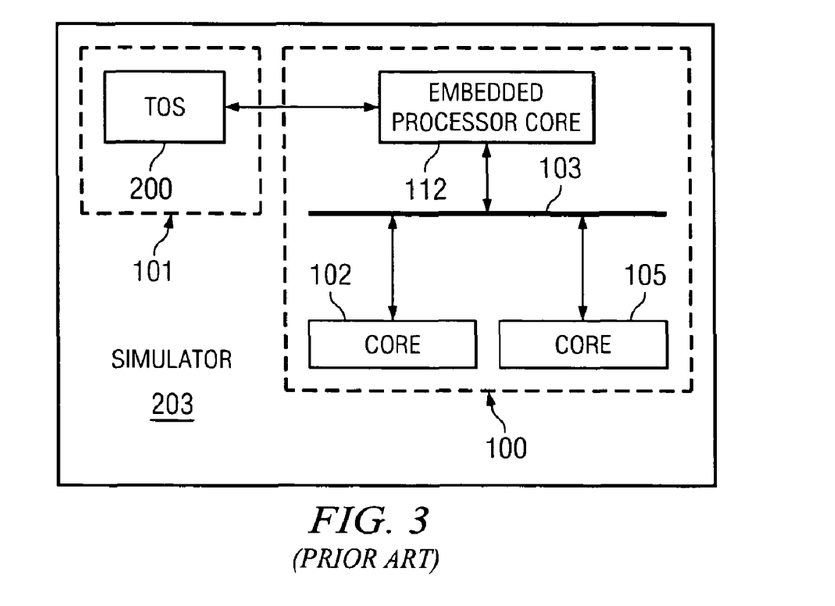
FIG. 3 is an exemplary diagram illustrating a TS being executed by an embedded processor in simulation.

As shown in FIG. 3, the TOS software 200 may be loaded into memory core 101 and executed by the embedded processor 112 within the simulator 203. The TOS software 200 being executed applies a verification test as described above to one or more cores, for example cores 102 and 105 as shown. In general the elements of the TOS are coded in a high-level programming language, such as "C", to provide for portability across SoC designs, hardware platforms, and from simulation to a hardware implementation of a SoC design. An example of test operating system software may be found in commonly assigned U.S. Pat. No. 6,615,167, which is hereby incorporated by reference.

As mentioned above, the time and money required to generate a simulator, core models, checkers, and the like to perform verification of a particular SoC design model represents a large investment by the designer and/or manufacturer of the SoC. To add to this large investment, the test application 201 must often include models of external devices with which the SoC model must communicate during testing so as to ensure proper operation of the SoC with external devices. Thus, not only do models of the SoC need to be generated, but models of other devices external to the SoC must be developed and utilized with the test application 201.

To avoid having to generate models of external devices, some simulations have the peripherals of the SoC model wrapped, i.e. the SoC's inputs are tied to its outputs. Alternatively, two similar unverified device models may have their inputs and outputs tied to each other. In both cases, there is no ability to absolutely verify and debug the SoC model since both input and output are associated with unverified devices and it is not possible to determine where exactly the error, if any, lies.

Often, models of external devices are available from third party vendors of these external devices which may be integrated with the test application for testing the SoC. However, even with these already established models, much effort is necessary to make the models compatible with the existing simulation environment. All of these factors lead to a problem in that the time required to test the model of the external devices in the simulation environment may exceed the test time for the SoC model that is actually being verified.

The present invention provides a mechanism for reducing the cost, in terms of time and monetary investment, involved in obtaining models of external devices for testing a SoC design. Rather than relying on third party developed software models of external devices, the SoC model under test is coupled to a previously verified SoC model. This previously verified SoC model, in a preferred embodiment, is a previous version of the SoC model under test which has been verified and is programmable such that it may be programmed with the TOS for testing the SoC model under test.

The previously verified SoC model and the SoC model under test interact with one another in a master/slave relationship. The previously verified SoC model operates as the master device while the SoC model under test operates as the slave device. The master device initiates transactions with the slave device with the slave device returning results of the transactions to the master device.

Using this master/slave relationship, the previously verified SoC model is provided with the same test stimuli, e.g., a data transaction, as the SoC model under test. Thus, the previously verified SoC model generates expected results data against which test data from the SoC model under test may be compared. The test stimuli are sent to the SoC model under test via a peripheral communication link, e.g., Ethernet, Universal Serial Bus (USB), Peripheral Component Interconnect (PCI), or other type of communication link, between the previously verified SoC model and the SOC model under test. The SoC model under test generates test data, e.g., transaction result data, which is output, via the modeled peripheral communication link, to the previously verified SoC model. The previously verified SoC model may then compare the expected results data generated by itself with the test data generated by the SoC model under test to determine if they match. If the two sets of data do not match, then a mismatch notification may be generated and output, such as to a display for viewing by a person performing the test, to a test log file, or the like.

Because the previously verified SoC model and the SoC model under test are most likely designed for use with the same or extremely similar simulation environments, the compatibility of the previously verified SoC model with the SoC model under test is not as much an issue as with third party vendor models of external devices. In other words, little, if any, time and expense is required in order to make the previously verified SoC model compatible with the simulation environment of the SoC model under test.

Moreover, if the previously verified SoC model is an earlier version of the SoC model under test, then the previously verified SoC model and the SoC model under test are generally intended to provide similar results to similar test stimuli. As a result, it is not necessary to generate separate checker software for checking the test result data generated by the SoC model under test since all that is necessary is to compare the test result data generated by the SoC model under test with the expected result data generated by the previously verified SoC model.

Figure 4:
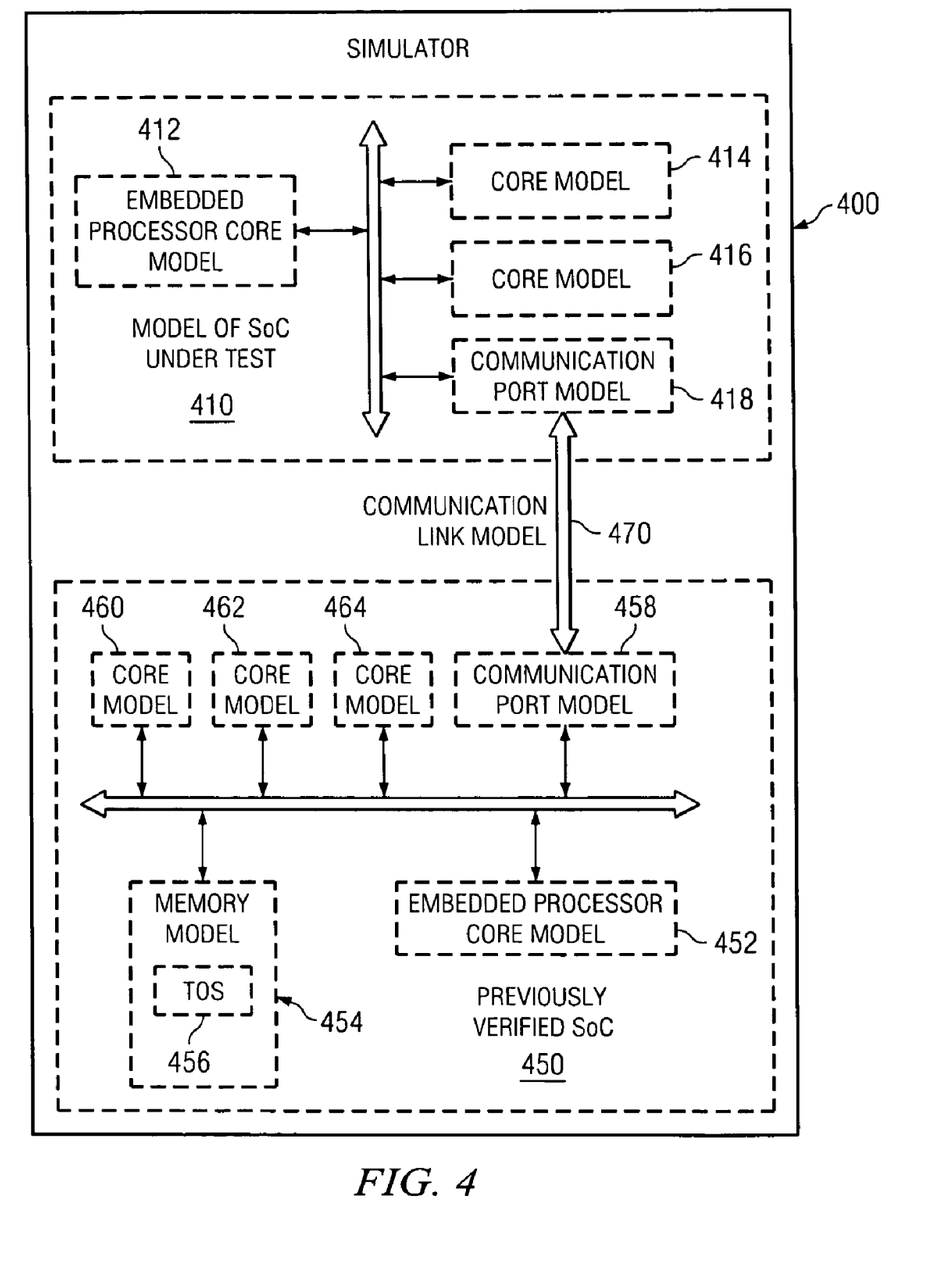
FIG. 4 is an exemplary diagram illustrating an exemplary implementation of one embodiment of the present invention.

FIG. 4 is an exemplary diagram illustrating an exemplary implementation of one embodiment of the present invention. As shown in FIG. 4, a model 410 of the System-on-a-chip (SoC) under test is provided to simulator 400 which simulates the operation of the SoC using the model 410. The model 410 may include models of cores 412-416 of the SoC under test. In addition, a peripheral communication interface, or communication port, model 418 is provided for communicating with external devices. While only a single peripheral communication interface is shown in FIG. 4, it should be appreciated that a plurality of peripheral communication interfaces may be provided in the model 410 without departing from the spirit and scope of the present invention. These models 410-416 may be provided, for example, as hardware description language (HDL) modules, netlist modules, or the like, as previously discussed above, for execution by the simulator 400 in response to test stimuli provided by a test operating system (TOS), for example.

The model of the SoC under test 410 is coupled to a model of a previously verified SoC 450 by way of a communication link model 470. This communication link 470 may be, for example, a communication bus or other type of communication link model over which the SoC under test 410 is to communicate with external devices via one or more peripheral communication interfaces, e.g., communication port model 418. Examples of such communication links 470 may include a PCI bus, USB link, Ethernet bus, or the like. The previously verified SoC model 450 communicates with the model of the SoC under test 410 via the communication port model 458 and the simulated communication port model 418.

The previously verified SoC model 450 is a programmable SoC model having a memory model 454, embedded processor core model 452, and a plurality of other core models 460-464, as discussed previously above. The test operating system (TOS) 456 may be loaded into the memory model 454 of the previously verified SoC model 450 for use in testing the model of the SoC under test 410.

The embedded processor core model 452, through simulation, executes the TOS 456 to thereby send test stimuli to the core models 452 and 460-464 of the previously verified SoC model 450 to thereby generate expected result data. In addition, the embedded processor core model 452 executes the TOS 456 to send the same test stimuli to the model of the SoC under test 410. The test stimuli are representative of stimuli that would be experienced by the SoC when interacting with external devices via a peripheral communication interface, for example.

The model of the SoC under test 410 generates test result data, based on the operation of the embedded processor core model 412 and core models 414-416, which is then communicated back to the previously verified SoC model 450 via the communication link model 470. The test result data and the expected result data may then be compared by the embedded processor core model 452 to determine if the model of the SoC under test 410 is operating correctly. The results of the comparison may be output to a display or test log file, for example, in order to inform a human test administrator. Alternatively, the test result data and the expected result data may be sent to another external testing device (not shown) for comparison and logging of results without departing from the spirit and scope of the present invention.

As previously mentioned above, in a preferred embodiment, the previously verified SoC model 450 is a previously verified version of the same SoC type as that of the model of the SoC under test 410. As a result, compatibility with the model of the SoC under test 410 and the testing environment established in the simulator 400 is assured. Moreover, since the previously verified SoC model 450 operates on the same test stimuli so as to generate expected test results, complex checkers need not be developed and all that is necessary is that the expected test results be compared to the actual test results to determine if there are any mismatches.

Figure 5:
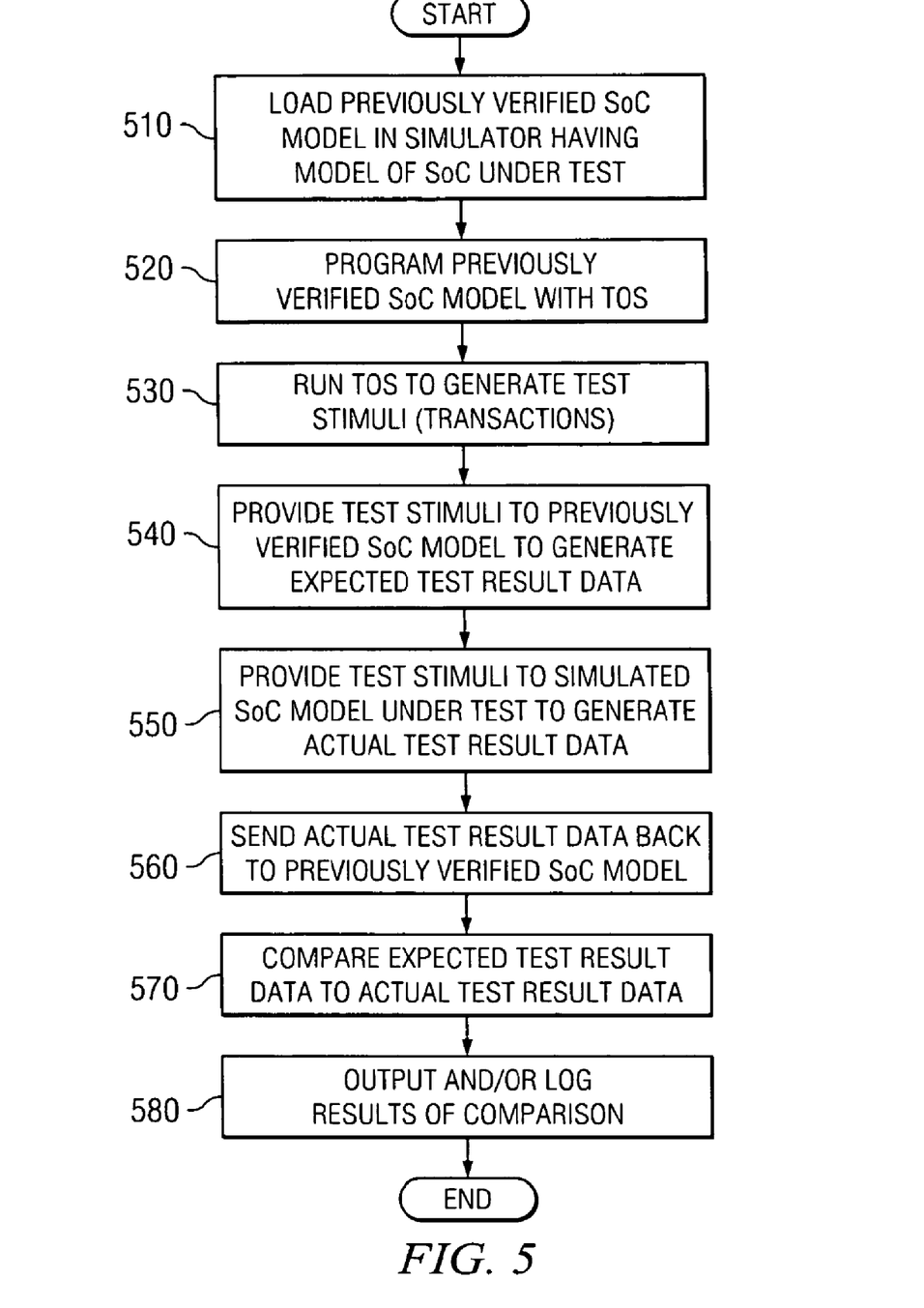
FIG. 5 is a flowchart outlining an exemplary operation of the present invention when testing a model of a SoC under test in accordance with one exemplary embodiment of the present invention.

FIG. 5 is a flowchart outlining an exemplary operation of the present invention when testing a model of a SoC under test in accordance with one exemplary embodiment of the present invention. It will be understood that each block, and combination of blocks, of the flowchart illustration in FIG. 5 can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 5, the operation starts with loading the simulator, in which a model of the SoC under test is being used to simulate the operation of the SoC, with a previously verified SoC model (step 510). The previously verified SoC model is programmed with a test operating system for running tests on the operation of the simulated SoC model under test (step 520). The test operating system then is permitted to run and thereby generate test stimuli (step 530).

The test stimuli are provided to the previously verified SoC model which generates expected test result data (step 540). In addition, the test stimuli are provided to the simulated SoC model under test which generates actual test result data (step 550). The actual test result data is sent back to the previously verified SoC model (step 560) and a comparison of the expected test result data and the actual test result data is performed (step 570). Results of the comparison are then reported and/or logged, i.e. whether there is a match or mismatch between the actual and expected test result data (step 580). The operation then terminates.

Thus, the present invention alleviates the time and expense of generating models of external devices, with which a SoC model under test is expected to communicate, by using a previously verified SoC model as the external device. This previously verified SoC model does not encounter the same compatibility issues with the simulation environment as third party vendor models of external devices. Moreover, the previously verified SoC model may be used to generate the expected results data based on the same test stimuli sent to the simulated SoC model under test and a simple comparison may be made. This eliminates the time and expense of generating complex checker software for checking the results data generated by the simulated SoC model under test.

While the preferred embodiments of the present invention have been described in terms of verifying a system-on-a-chip design using a previously verified model of a prior version of the system-on-a-chip, the present invention is not limited to such an application. Rather, the principles and mechanisms of the present invention may be equally applicable to verification of other devices other than a system-on-a-chip. In short, any device that may be modeled using a computer simulation may be verified using the same principles and mechanisms as described above. Basically, as long as a previously verified device model may be used to initiate and administer testing of a current device under test model in a simulation environment, such embodiments are intended to be within the spirit and scope of the present invention.

It is important to note that while the present invention has been described in the context of a fully functioning data processing system, as mentioned earlier, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer useable storage device having a computer readable program, wherein the computer readable program, when executed on a computing device, causes the computing device to:

couple a model of a previously verified device to a model of a device under test via a communication interface model;

program the model of the previously verified device to store and execute a test program for applying one or more tests to the model of the device under test;

run the test program in the model of the previously verified device to thereby apply the one or more tests to the model of the device under test via the communication interface model; and verify operation of the device under test based on results of running the test program, wherein:

the device under test and the previously verified device are both a system-on-a-chip (SoC), the model of the device under test is a SoC model under test, the model of the previously verified device is a previously verified SoC model that is an earlier version of a same type of SoC as the SoC model under test, the previously verified SoC model and the SoC model under test have a master/slave relationship, the previously verified SoC model has a programmable memory model, the model of the previously verified device is programmed to store and execute a test program by storing a test operating system in the memory model of the previously verified SoC model, the previously verified SoC model acts as a master device in applying the one or more tests using the test operating system to the SoC model under test which acts as a slave device, the test operating system applies the same test stimuli to one or more core models of the previously verified SoC model and to the SoC model under test, and the test stimuli are stimuli that would be experienced by the device under test when interacting with one or more devices external to the device under test via a peripheral communication interface.

2. The computer program product of claim 1, wherein the computer readable program further causes the computing device to:

apply the one or more tests to the previously verified SoC model to thereby generate expected test results.

3. The computer program product of claim 1, wherein the SoC model under test generates actual test results based on the application of the one or more tests by the previously verified SoC model, and wherein the computer readable program further causes the computing device to:

compare the actual test results to the expected test results;

determine if there is a mismatch between the actual test results and the expected test results based on the comparison; and output results of the comparison.

4. The computer program product of claim 3, wherein the computer readable program causes the computing device to output the results of the comparison by one of displaying a notification or storing the results of the comparison in a data structure.

5. The computer program product of claim 1, wherein the previously verified SoC model and the SoC model under test have a master/slave relationship, wherein the previously verified SoC model acts as a master device and the SoC model under test acts as a slave device.

6. An apparatus for testing a model of a device under test, comprising:

a processor; and a memory coupled to the processor, wherein the memory is programmed with instructions, which when executed by the processor, causes the processor to:

couple a model of a previously verified device to a model of a device under test via a communication interface model;

program the model of the previously verified device to store and execute a test program for applying one or more tests to the model of the device under test;

run the test program in the model of the previously verified device to thereby apply the one or more tests to the model of the device under test via the communication interface model; and verify operation of the device under test based on results of running the test program, wherein:

the device under test and the previously verified device are both a system-on-a-chip (SoC), the model of the device under test is a SoC model under test, the model of the previously verified device is a previously verified SoC model that is an earlier version of a same type of SoC as the SoC model under test, the previously verified SoC model and the SoC model under test have a master/slave relationship, the previously verified SoC model has a programmable memory model, the model of the previously verified device is programmed to store and execute a test program by storing a test operating system in the memory model of the previously verified SoC model, the previously verified SoC model acts as a master device in applying the one or more tests using the test operating system to the SoC model under test which acts as a slave device, the test operating system applies the same test stimuli to one or more core models of the previously verified SoC model and to the SoC model under test, and the test stimuli are stimuli that would be experienced by the device under test when interacting with one or more devices external to the device under test via a peripheral communication interface.

7. The apparatus of claim 6, wherein the instructions further cause the processor to:

apply the one or more tests to the previously verified SoC model to thereby generate expected test results.

8. The apparatus of claim 6, wherein the SoC model under test generates actual test results based on the application of the one or more tests by the previously verified SoC model, and wherein the instructions further cause the processor to:

compare the actual test results to the expected test results;

determine if there is a mismatch between the actual test results and the expected test results based on the comparison; and output results of the comparison.

9. The apparatus of claim 6, wherein the previously verified SoC model and the SoC model under test have a master/slave relationship, wherein the previously verified SoC model acts as a master device and the SoC model under test acts as a slave device.

* * * * *